United States Patent
Siikonen et al.

(10) Patent No.: US 10,183,836 B2
(45) Date of Patent: Jan. 22, 2019

(54) ALLOCATING DESTINATION CALLS USING GENETIC ALGORITHM EMPLOYING CHROMOSOMES

(71) Applicant: KONE Corporation, Helsinki (FI)

(72) Inventors: Marja-Liisa Siikonen, Helsinki (FI); Mirko Ruokokoski, Veikkola (FI)

(73) Assignee: KONE CORPORATION, Helsinki (FI)

( * ) Notice: Subject to any disclaimer, the term of this patent is extended or adjusted under 35 U.S.C. 154(b) by 399 days.

(21) Appl. No.: 14/956,037

(22) Filed: Dec. 1, 2015

(65) Prior Publication Data

US 2016/0152438 A1  Jun. 2, 2016

Related U.S. Application Data

(63) Continuation of application No. PCT/EP2013/062055, filed on Jun. 11, 2013.

(51) Int. Cl.
*B66B 1/18* (2006.01)
*B66B 1/24* (2006.01)

(52) U.S. Cl.
CPC ........ *B66B 1/2466* (2013.01); *B66B 2201/20* (2013.01); *B66B 2201/211* (2013.01); *B66B 2201/212* (2013.01); *B66B 2201/213* (2013.01); *B66B 2201/214* (2013.01); *B66B 2201/215* (2013.01); *B66B 2201/233* (2013.01); *B66B 2201/243* (2013.01); *Y02B 50/122* (2013.01)

(58) Field of Classification Search
CPC ............. B66B 1/2466; B66B 2201/211; B66B 2201/212; B66B 2201/213; B66B 2201/214; B66B 2201/215; B66B 2201/233; B66B 2201/20; B66B 2201/243; Y02B 50/122
USPC ................. 187/247, 380–389, 391, 393, 396
See application file for complete search history.

(56) References Cited

U.S. PATENT DOCUMENTS

| | | | |
|---|---|---|---|
| 5,331,121 A * | 7/1994 | Tsuji ..................... | B66B 1/2408 187/388 |
| 5,907,137 A | 5/1999 | Tyni et al. | |
| 5,932,852 A | 8/1999 | Tyni et al. | |
| 6,293,368 B1 | 9/2001 | Ylinen et al. | |
| 6,644,442 B1 * | 11/2003 | Ylinen ..................... | B66B 1/20 187/382 |
| 6,776,264 B2 * | 8/2004 | Tyni ......................... | B66B 1/20 187/247 |
| 6,889,799 B2 * | 5/2005 | Tyni ..................... | B66B 1/2458 187/247 |

(Continued)

FOREIGN PATENT DOCUMENTS

| CN | 1181741 A | 5/1998 |
|---|---|---|
| CN | 1222480 A | 7/1999 |

(Continued)

*Primary Examiner* — Anthony Salata
(74) *Attorney, Agent, or Firm* — Birch, Stewart, Kolasch & Birch, LLP

(57) ABSTRACT

A method of assigning destination call in an elevator group forms chromosomes including genes where each gene is a correlation of a call and an elevator trip, the possible round trips are calculated, each round trip is evaluated for optimization procedure. The calls are assigned to the elevators by the destination call control based on the best chromosome determined.

14 Claims, 3 Drawing Sheets

Illustration of solution BB

(56) References Cited

U.S. PATENT DOCUMENTS

| | | | |
|---|---|---|---|
| 6,913,117 B2 * | 7/2005 | Tyni | B66B 1/20 187/382 |
| 7,140,472 B2 * | 11/2006 | Tyni | B66B 1/20 187/382 |
| 7,484,597 B2 * | 2/2009 | Nikovski | B66B 1/18 187/247 |
| 7,546,906 B2 * | 6/2009 | Tyni | B66B 1/2458 187/247 |
| 7,594,564 B2 * | 9/2009 | Siikonen | B66B 5/021 187/290 |
| 7,909,143 B2 * | 3/2011 | Tyni | B66B 1/2458 187/247 |
| 9,617,115 B2 * | 4/2017 | Sarjanen | B66B 1/2458 |
| 2015/0166301 A1 * | 6/2015 | Sorsa | B66B 1/2458 187/388 |
| 2017/0081148 A1 * | 3/2017 | Salmikuukka | B66B 1/3407 |

FOREIGN PATENT DOCUMENTS

| | | |
|---|---|---|
| EP | 0 709 332 A1 | 5/1996 |
| EP | 1 269 146 | 1/2003 |
| WO | WO 95/31393 A1 | 11/1995 |
| WO | WO 01/65231 A2 | 9/2001 |

* cited by examiner

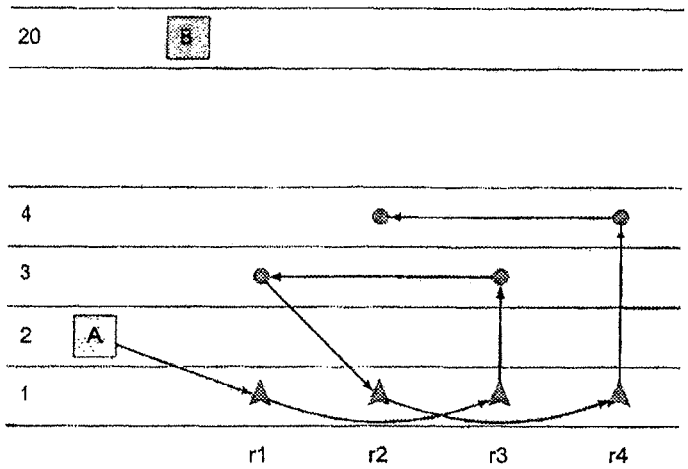
Figure 1: Illustration of solution AA
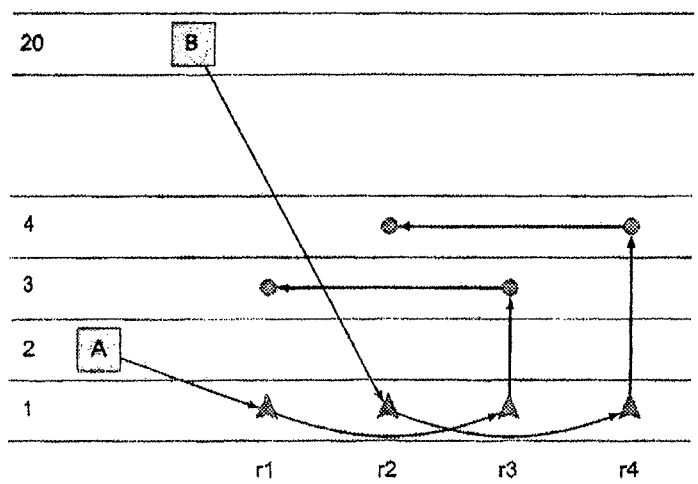
Figure 2: Illustration of solution BB

ALLOCATING DESTINATION CALLS USING GENETIC ALGORITHM EMPLOYING CHROMOSOMES

CROSS REFERENCE TO RELATED APPLICATIONS

This application is a Continuation of PCT International Application No. PCT/EP2013/062055 filed on Jun. 11, 2013, which is hereby expressly incorporated by reference into the present application.

BACKGROUND OF THE INVENTION

The present invention relates to a method for allocating and serving destination calls in an elevator group comprising several elevators using destination call control. Usually, in destination call control immediate call allocation is used which means that immediately after having issued a call at a destination operation panel (DOP), the number of the allocated elevator to be boarded is indicated to the passenger. The present invention now relates to a method for allocating and serving destination calls when the calls issued to the elevator group can't be served by all elevators of the elevator group in one round trip. With the term "all" elevators, all active elevators which participate in the call allocation are indicated, i.e. all elevators which can be used for serving a destination call. The problem of allocating non-fixed destination calls and designing a corresponding service route for the elevators is called elevator dispatching problem (EDP).

Up to now, in the above situation where all elevators are not able to handle all destination calls in one round trip, the message "please wait" is indicated at the destination operation panel. This is quite frustrating for the passenger as he can't even input his destination call into the system. This can lead to a situation where passengers queue up in front of the DOP to wait for the issuing of their destination call.

It is therefore object of the present invention to handle destination calls in the above situation in a more economical way.

The invention is solved with a method according to claim 1. Preferred embodiments of the invention are subject-matter of the dependent claims.

BRIEF DESCRIPTION OF THE DRAWINGS

FIG. 1 illustrates one exemplary solution proposal for serving elevator calls;

FIG. 2 illustrates another exemplary solution proposed for serving elevator calls;

DETAILED DESCRIPTION OF PREFERRED EMBODIMENTS

Figure 3:
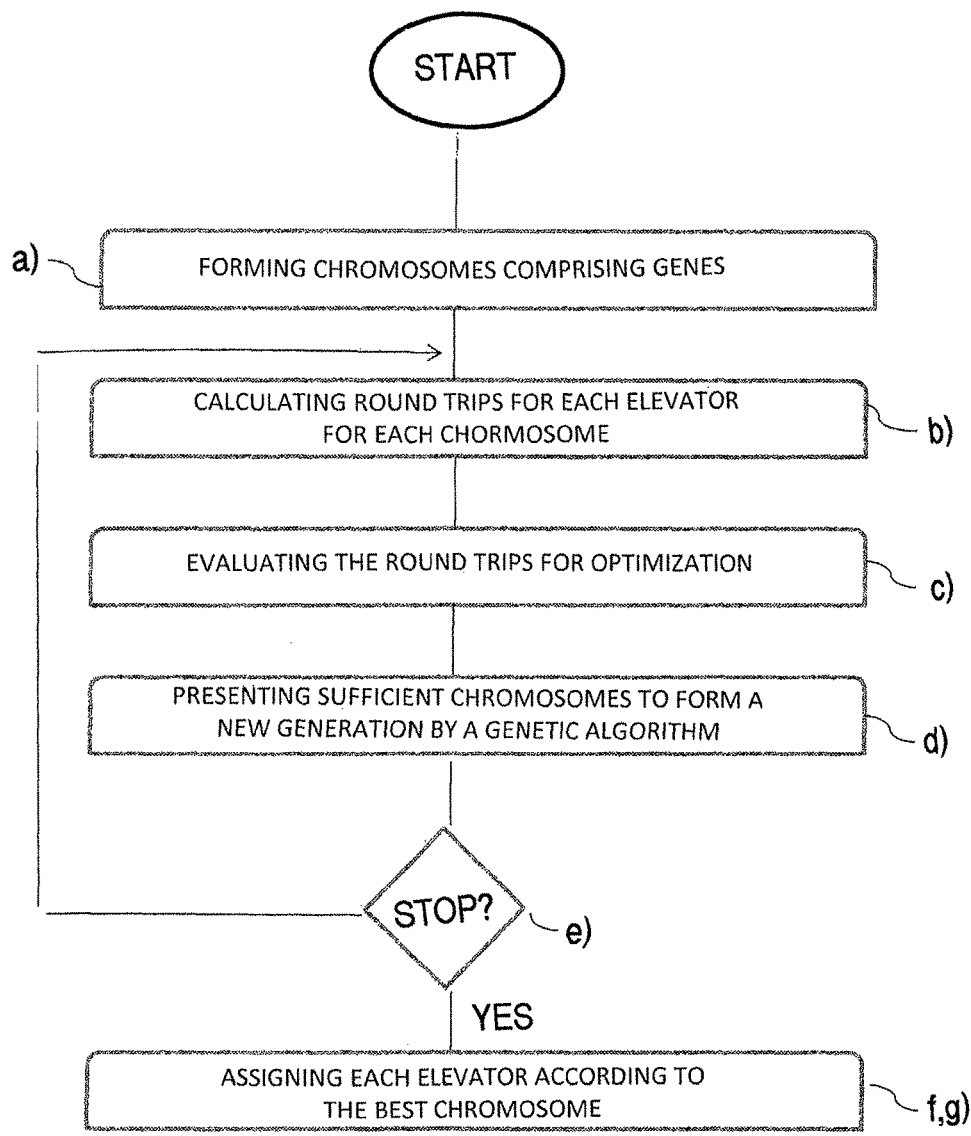
FIG. 3 discloses an algorithm as used in the control allocation strategy of the present application.

FIG. 3 illustrates the method according to the teachings of the present application. The present invention starts from a situation where "n" open calls and "m" fixed calls are present in the elevator group. The fixed calls are calls that are already allocated to certain elevators but still not served, which means that the passenger for these allocated calls are still standing in the lobbies of the corresponding landings and wait for their calls to be served. In the allocation procedure of the invention a genetic algorithm is used, in which the following succession of steps is performed: In a first step a) of FIG. 3, chromosomes comprising genes are formed. In said chromosomes n first genes comprise a correlation of each open call and a corresponding elevator. Accordingly, these first n genes corresponding to the n open calls comprise a call allocation, each. Further, the chromosome comprises n second genes with a correlation of each open call and the corresponding number of the round trip in which the open call is to be served. As the situation is by definition such that not all calls can be served within one round trip, the number of the round trip is usually two or three, at the maximum, whereby three should establish the maximum allowable number for the round trip. The third round trip means that the passenger has to await two complete round trips being terminated after his destination call is to be served.

Finally, the chromosomes comprise m third genes with a correlation of each fixed call and the corresponding number of the round trip in which the fixed call is going to be served. Here it has to be considered that each destination call comprises the departure floor as well as the destination floor. In the first generation of chromosomes, the building of the chromosomes can be done with calculated values or by random. Of course, the forming of the first generation chromosomes may be aided by statistical data from the traffic history of the elevator group. This leads to a certain fitness of the chromosomes already in the first generation.

After the first generation of chromosomes has been established, in a second step b) of FIG. 3, round trips are calculated for each of these chromosomes of the first generation for each elevator of the elevator group according to collective control. Collective control is the most common control mechanism for the serving of elevator calls during a round trip of an elevator. Collective control means that the elevator serves all destination calls whose departure floor and destination floor are ahead in the travelling direction of the elevator. The elevator stops at any floor in travelling direction which is a departure and/or destination floor. In collective control passengers use up and down buttons for inputting the travel direction to the elevator system. The elevator will serve the call if the departure floor (floor of the issuing of the call) as well as the correlated destination floor are ahead in the travelling direction of the current round trip. A round trip is the drive of an elevator in up and down direction via two direction turning points until he again reaches the starting position.

If the departure floor is ahead but the input travelling direction is in the opposite direction, either another elevator will serve the call or the elevator takes up the call after having reached the direction turning point of his round trip and drives back in the opposite direction. With the chromosomes, it is possible to consider the round trips for each elevator of the elevator group which are necessary to serve all open and fixed calls.

In a next step c) of FIG. 3, the round trips of the elevators calculated in step b) are evaluated according to known optimization criteria for call allocation methods. In this evaluation each chromosome is given a so called fitness value describing how much the solution of the chromosome satisfies the adopted optimization criteria or mix of optimization criteria. Such optimization criteria are e.g. passenger riding time, passenger waiting time, total journey time, energy consumption, number of stops, minimum number of round trips, etc.

In a next step d) of FIG. 3, the chromosomes which are evaluated in step c) as providing a sufficient fitness value are put forward to the forming of a new generation of chromosomes by per se known methods of a genetic algorithm, for example cross-breeding mutation, etc.

For the new generation of the chromosomes, steps b) to d) are repeated for each generation of chromosomes until a stop criterion is achieved. The stop criterion may be the achieving of a certain optimization value, certain coherence of the values or simply a certain time or number of generations.

Finally, the calls are served in collective control according to the best chromosome in step g) of FIG. 3. This leads to an optimization of the handling passenger capacity of the elevator group according to certain optimization criteria even for situations in which the calls can't be served by the elevators within one round trip, which is normally a situation when the transport capacity of the elevator group is exceeded. Parameters for this situation are the size of the elevators, thevelocity of the elevators, the acceleration and deceleration time, door opening and closing times as well as the number of elevators in the group as well as the traffic flow in persons per time.

Whereas normal call allocation methods are able to handle situations in an optimized manner where the number of incoming calls is lower than the handling capacity of the elevator group, the present invention is able to solve the EDP under consideration of several round trips, i.e. quite far into the future. The invention is able to handle situations in an optimized manner where the transport capacity of the elevator group is exceeded to such an amount that the unserved calls cannot be handled within one round trip of all elevator cars. The present invention now provides a solution where also the serving of calls can be controlled for the next round trip or even a further round trip ahead.

Preferably, in the inventive method, no immediate call allocation is used which is up to now quite common for destination call allocation. Usually, with the issuing of a destination call, immediately an elevator of the elevator group is allocated. In one embodiment of the present invention, with the issuing of a destination call the passenger is referred to a common display in the landing where he shall wait for the announcement of his destination floor. This provides more flexibility for the elevator group control in the allocation of elevators to the different calls, as new incoming calls can still be considered until the serving elevator is indicated on the common display to serve the call, which is short before its arrival at the landing (which is the floor of issuing a destination call=the departure floor of the call).

Furthermore, preferably, the destinations of an elevator which is going to arrive at the landing are shown on a common display. Accordingly, a passenger which has been referred to the common display after having issued his call can see for each of the incoming elevators if one of these elevators serves his destinations. This provides a higher flexibility for the elevator group control in the allocation of the calls so that changes in the status of open calls can be considered to a high degree. Furthermore, after the issuing of a call, the passenger knows that his call has already been considered by the elevator group control and he only has to wait for the indication of his destination floor. The possibility of being able to issue a call and the knowledge that his issued call is going to be considered is much better than the current obligation to wait for the DOP being ready to accept a destination call.

Alternatively or additionally to one common display at a central location in the elevator lobby several common elevator displays could be provided, each of them being located next to the landing door of each elevator. This leads to a better distribution of the waiting passengers in the lobby and thus prevents the building of queues in front of a single common display.

Preferably, on the common elevator display next to each landing door only those destination floors could be shown which will be served by the corresponding elevator during his current round trip. It is assumed that only passengers whose destination coincides with the indicated floors should board the elevator when it arrives at the floor and passengers whose destination floors are not indicated should not board.

Preferably, when a passenger issues his destination floor on a DOP, it could be immediately allocated to an elevator which is announced to the passenger on the DOP with a note, e.g. "Please follow instructions on the display of the allocated elevator" which leads the passenger to the common elevator display. Before the allocated elevator arrives at the landing the destination floors at which the elevator will stop in its current round trip are shown on the common elevator display beside the elevator landing door. Hereby a part of the waiting passengers can be picked up in the current round trip whereas others which are served in later round trips still have to wait. The served destinations are cleared from the common elevator display when the elevator leaves or after the elevator has left the landing.

This shows that the invention works with immediate call allocation as also without it.

The above mentioned new guiding system together with the inventive call allocation and serving method optimizes the allocation and serving of destination call in heavy duty cycles and particularly in case of overcapacity situations as mentioned above and solves the EDP problem.

Generally, it is possible that the DOPs comprise the buttons for inputting a destination call and also comprise the common display for showing the destinations of elevators which are going to arrive at the landing. Preferably, these common displays are located at a different location remote from the DOPs so that the buttons for inputting new calls are not obstructed by waiting passengers monitoring the common display.

The common display is preferably an LCD display or comparable electronic display which is preferably installed in the lobby of the landing. It should be located in a central point so that each passenger is able to reach his elevator within a short time if his destination is indicated in connection with an arriving elevator.

According to the invention, only those destinations are displayed on the common display, which are going to be served in the current round trip according to the selected best chromosome. Hereby any call is served in that round trip which has been selected in the GA as optimal for the applied optimization criteria. The destinations are displayed shortly before the elevator arrives at a lading. The term "shortly" refers to times which are well known for current up/down push button control, wherein the passenger is informed of his elevator shortly before its arrival. Accordingly "shortly" may preferably comprise a time frame from two to ten seconds. The aim of this time frame is to give the passenger enough time to pass the distance from the common display to his elevator.

Preferably the elevators do not have any car operating panel which allows the input of car calls. Alternatively the elevator control does not accept any car calls in a overcapacity situation. This prevents a passenger from misusing the car panel to input a destination in the car after having entered an elevator not showing his destination floor.

According to a test situation which is going to be analyzed hereinafter four different destination calls have been allocated to elevator A, whereby the departure floor of each call is the first floor. Each destination call consists of the departure and destination floors. Details of the calls are given in Table 1. For clarity reasons it is supposed that the capacity of elevator A is 2 passengers, it is empty, and it is about to stop at floor to pick up some passengers. Now with the help of the inventive optimization and the corresponding common display, elevator A can first pick up calls r1 and r3, then delivery them to floor 3, and finally come back to floor 1 to pick up calls r2 and r4. Without this kind of guiding system, it can be possible that elevator A picks up first calls r1 and r2 in the first round trip and then in the second one the remaining calls. This means that in both round trips, both floors 3 and 4 are visited, which is an uneconomical situation.

TABLE 1

Departure and destination floors of the calls

| Call | Departure floor | Destination floor |
|------|-----------------|-------------------|
| r1   | 1               | 3                 |
| r2   | 1               | 4                 |
| r3   | 1               | 3                 |
| r4   | 1               | 4                 |

Accordingly the instructions on the common displays when to board a car, is provided by the inventive allocation procedure comprising a genetic algorithm which processes information related to round trips.

Up to now in prior art allocation methods the decision variables of said allocation procedure to specify the allocation of calls to elevators, are e.g. of the form:

$$x_i = k \quad (1)$$

if call i is allocated to elevator k. This means that the current known allocation models cannot be used as such to derive instructions for passengers. The decision variables of the routing specify directly the service order of the passengers and thus consider an unlimited amount of round trips for each elevator. However, considering an unlimited amount of round trips can be time consuming.

Accordingly, the inventive allocation procedure presents a more efficient optimization model which considers only a limited amount of round trips for each elevator. The model is motivated by the observation that usually in well sized elevator groups the maximum number of round trips needed to serve all waiting passengers—providing that no new passengers arrive until all current calls has been completely served—is just a few. In the inventive allocation procedure the decision variables are of the form:

$$x^{ji} = k \quad (2)$$

if call i is allocated to elevator k and it served by k in its $j^{th}$ round trip. Depending on the traffic condition, the upper bound of j is restricted to 1 or 2 (possible to 3 in very heavy conditions). Let n denote the number of calls that have to be allocated and let m denote the number of calls that have assignments to elevators but the passengers related to them are still waiting elevators at lobbies, i.e., are not on-board. Suppose that each elevator has travel direction. These decision variables are encoded as chromosomes in the following way. The first n genes say the allocation of non-allocated calls to elevators while the next n specify in which round trip these calls are served. The last m genes state in which round trip the fixed calls are served.

With this kind of encoding the genetic algorithm (GA) used in the allocation procedure can be used as an optimization model to solve the task to efficiently handle the call allocation where calls can be served not within the first round trip. So chromosomes are formed, comprising first genes wherein each of the open calls are allocated to one elevator of the elevator group, which first genes preferably form the first part of the chromosome. Further, second genes are formed in the chromosome which specify for each elevator a link to a round trip. In a third part of the chromosome third genes are formed wherein allocated but still not served calls (fixed calls) are linked to a round trip. For the evaluation of the fitness of each chromosome the calls of each round trip are ordered according to collective control. This encoding procedure is illustrated in the next example.

An instance with two elevators, A and B, is considered, the capacity of both being 2 passengers, and four calls r1-r4 are pending. Suppose that r1 has been fixed to elevator A, the further calls have no assignments, elevator B is located at floor 20 and is idle, and A is empty and moving towards floor 1. The details of the calls are given in Table 2.

TABLE 2

Departure and destination floors as well as the states of the calls

| Call | Departure floor | Destination Floor | Serving elevator |
|------|-----------------|-------------------|------------------|
| r1   | 1               | 3                 | A                |
| r2   | 1               | 4                 | —                |
| r3   | 1               | 3                 | —                |
| r4   | 1               | 4                 | —                |

Chromosomes of this instance have 7 seven genes. Now each of these chromosomes is evaluated according to collective control principle which has been described above. With this evaluation for each chromosome of a population a fitness value is established. Only those chromosomes having a sufficient fitness value are admitted to the formation of the next generation. This could for example be handled by admitting only the chromosomes with the best 20 or 30 (or any other appropriate number) fitness values to the formation of the next generation. The next generation is then formed with per se known GA methods as e.g. cross-breeding and mutation. The optimization with the GA is continued until a stop criterion is reached. This stop criterion can be the reaching of a certain generation of population (e.g. the $10^{th}$ population) or a certain coherence of the best chromosome of each following generation of the reaching of a certain absolute value or simply the lapse of a certain processing time. With the stop criterion the calls are served according to the best chromosome of the last population. A certain aspect of the invention belongs the guiding of the passengers in said case. Usually in destination control the elevator is immediately allocated after giving the call. Now according to the invention the elevator is allocated to the passenger only shortly before it arrives at his departing floor. On that behalf preferably a message is given to the passenger when he issues his call at the DOP to refer with respect to the serving elevator to the common display at the landing. On this common display the destination floor of the passenger is shown only at that time when an elevator heading to the passenger's destination floor within the current round trip is going to arrive at the landing. Via this measure passengers are informed when to enter which elevator. Further, this measure stops passengers who will be served only with a later round trip to enter an elevator beforehand. At that stage also immediate allocation could be used. Accordingly, when a passenger issues his destination floor on a DOP, it could be immediately allocated to an elevator which is announced to the passenger on the DOP with a note, e.g. "Please follow instructions on the display of the allocated elevator" which leads the passenger to the common elevator display.

Figure 4:
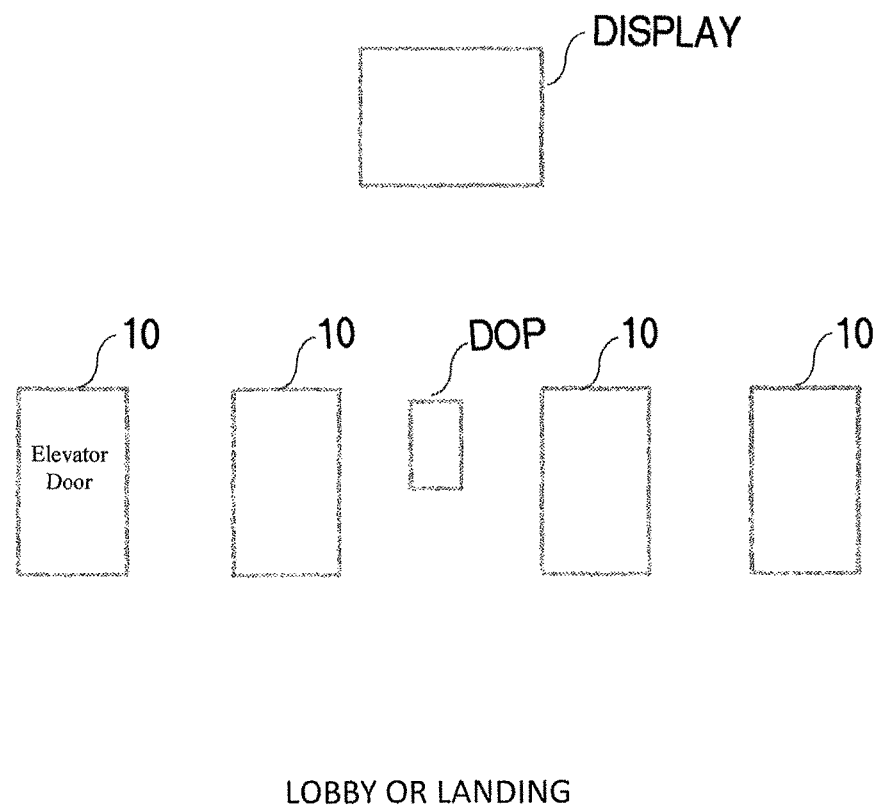
FIG. 4 illustrates the Display and DOP in relation to doors 10 of plural elevators in an exemplary lobby or landing.

Preferably, the common display is located at each elevator lobby as illustrated in FIG. 4. When a passenger registers a call, the serving elevator is not shown on the DOP. Instead, when some elevator arrives at that floor, the common display DISPLAY will show at which floor the elevator will stop within the current round trip and the passengers having those destination floors should board the car via a door 10 in the elevator lobby.

The serving of the passengers according to the best chromosome is performed according to the collective control principle.

Coming back to the above example solution proposal AA shows a solution wherein all calls are served by elevator A as elevator B is not available. According to the best solution found with the GA calls r1 and r3 are served in the first round trip whereas calls r2 and r4 are served in the second round trip of elevator A. FIG. 1 illustrates this solution.

The corresponding chromosome is given in Table 3 in the last row.

TABLE 3

Chromosome of solution proposal AA where all calls are served by elevator A, whereby calls r1 and r3 are served in the first round trip and calls r2 and r4 are served in the second round trip.

| Non-allocated calls | | | | | | Allocated calls |
|---|---|---|---|---|---|---|
| Allocation | | | Round trip index | | | Round trip index |
| r2 | r3 | r4 | r2 | r3 | r4 | r1 |
| A | A | A | 2 | 1 | 2 | 1 |

A second optimal solution proposal BB considers both elevators A and B for the serving of the calls. In this solution calls r1 and r3 are served by elevator A in the first round trip whereas calls r2 and r4 are served by B in the first round trip as well. FIG. 2 illustrates this solution and Table 4 shows the corresponding chromosome.

TABLE 4

Chromosome of solution proposal BB where calls r1 and r3 are served by elevator A and calls r2 and r4 are served by elevator B.

| Non-allocated calls | | | | | | Allocated calls |
|---|---|---|---|---|---|---|
| Allocation | | | Round trip index | | | Round trip index |
| r2 | r3 | r4 | r2 | r3 | r4 | r1 |
| B | A | B | 1 | 1 | 1 | 1 |

The essential advantage of this invention is that now the optimization model comprised in the GA contains of the round trip indices, i.e., it is possible to design elevator routes over one round trip, which eliminates the need for showing the please wait message of current destination control systems in case of over-capacity. Also with the help of the current displays, the elevators can pick up part of the waiting passengers that are going to the same floors which reduces the number of stops which in turn increase the handling capacity of the group.

The invention claimed is:

1. Method for handling destination calls in an elevator group comprising several elevators using destination call control, which method comprises an allocation procedure for situations where the calls can't be served by all elevators of the elevator group in one round trip, in which situation "n" open calls and "m" fixed calls are present, which fixed calls are already allocated but not served, in which allocation procedure comprises:
   a) forming chromosomes comprising genes in which chromosomest,
      n first genes comprise a correlation of each open call and a corresponding elevator,
      n second genes comprise a correlation of each open call and the corresponding number of the round trip in which the open call will be served, and
      m third genes comprise a correlation of each fixed call and the corresponding number of the round trip in which the fixed call will be served,
   b) calculating for each chromosome round trips for each elevator of the elevator group according to collective control,
   c) evaluating the round trips of all elevators calculated in step b) according to known optimization criteria,
   d) presenting chromosomes evaluated in step c) as sufficient to the forming of a new generation by per se known genetic algorithm ("GA") methods,
   e) repeating the steps b) to d) for each chromosome of each new generation of chromosomes until a stop criterion is achieved,
   f) wherein the calls are served in collective control according to the best chromosome of the last generation, and
   g) assigning the destinations of each elevator in its travelling direction in the current round trip according to the best chromosome to allow them to be shown on at least one common display shortly before each elevator's arrival at said landing.

2. Method according to claim 1, wherein with the issuing of a destination call via a destination operation panel (DOP) the passenger is referred by said panel to a common display of the landing.

3. Method according to one of the preceding claims, wherein no immediate call allocation is made after the issuing of a destination call.

4. Method according to claim 1, wherein after the issuing of a destination call, the elevator is immediately allocated.

5. Method according to claim 4, wherein the passenger is referred to a common elevator display located adjacent the landing door of the allocated elevator.

6. Method according to claim 1, wherein the maximal number of round trips is limited to three.

7. Method according to claim 1, wherein the elevator systems does not accept car calls in an overcapacity situation.

8. Method according to claim 1, wherein as the common display one common display in the center of the elevator lobby of each landing is used.

9. Method according to claim 1, wherein as the common display common elevator displays beside the landing door of each elevator are used.

10. Method according to claim 2, wherein the maximal number of round trips is limited to three.

11. Method according to claim 3, wherein the maximal number of round trips is limited to three.

12. Method according to claim 4, wherein the maximal number of round trips is limited to three, particularly to two.

13. Method according to claim 5, wherein the maximal number of round trips is limited to three, particularly to two.

14. Method according to claim 2, wherein the elevator systems does not accept car calls in an overcapacity situation.

\* \* \* \* \*